（12） United States Patent
Sauder et al.

(10) Patent No.: US 7,779,770 B2
(45) Date of Patent: Aug. 24, 2010

(54) METHOD OF RETROFITTING A PNEUMATIC ON-DEMAND SEED DELIVERY SYSTEM AND AN IMPROVED PNEUMATIC ON-DEMAND SEED DELIVERY SYSTEM

(75) Inventors: Derek A. Sauder, Tremont, IL (US); Chad E. Plattner, Tremont, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 11/742,576

(22) Filed: Apr. 30, 2007

(65) Prior Publication Data
US 2008/0264313 A1 Oct. 30, 2008

(51) Int. Cl.
*A01C 7/00* (2006.01)
*A01C 9/00* (2006.01)
*A01C 15/00* (2006.01)
*B65G 59/04* (2006.01)
*B65H 3/08* (2006.01)

(52) U.S. Cl. ............... 111/185; 111/170; 111/200; 111/900; 221/211

(58) Field of Classification Search ......... 111/170–188, 111/77, 900, 925, 200; 221/211
See application file for complete search history.

(56) References Cited

U.S. PATENT DOCUMENTS

| 4,836,412 | A | 6/1989 | Webber et al. |
| 5,161,473 | A | 11/1992 | Landphair et al. |
| 5,170,909 | A | 12/1992 | Lundie et al. |
| 5,325,800 | A | 7/1994 | Wisor et al. |
| 5,379,706 | A | 1/1995 | Gage et al. |
| 5,392,722 | A | 2/1995 | Snipes et al. |
| 6,581,533 | B1 | 6/2003 | Hagen et al. |
| 6,675,728 | B2 | 1/2004 | Lee et al. |
| 6,758,153 | B1 | 7/2004 | Hagen et al. |
| 6,935,255 | B2 | 8/2005 | Hagen et al. |

*Primary Examiner*—Christopher J. Novosad
(74) *Attorney, Agent, or Firm*—Larkin Hoffman Daly & Lindgren Ltd.; Thomas J. Oppold

(57) ABSTRACT

A pneumatic on-demand seed delivery system wherein seed from the auxiliary hopper enters the seed meter through an opening beginning rearward of the vertical axis of the seed meter. And a retrofit kit for existing on-demand seed delivery systems, and method of retrofitting such existing pneumatic on-demand seed delivery systems, so as to provide an auxiliary hopper that communicates seed to the seed meter through an opening beginning rearward of the vertical axis of the seed meter.

8 Claims, 7 Drawing Sheets

1

METHOD OF RETROFITTING A PNEUMATIC ON-DEMAND SEED DELIVERY SYSTEM AND AN IMPROVED PNEUMATIC ON-DEMAND SEED DELIVERY SYSTEM

BACKGROUND

There is an increased awareness among the agricultural community as to the economic importance of planting accuracy. This increased awareness and the desire to improve seed meter accuracy is due in part to the recent increase in the price of corn. For example, with corn prices near $4 per bushel, improving the seed singulation accuracy of a seed meter by a single percentage point can translate into eight dollars ($8.00) more per acre. Accordingly, there is a significant need to provide a seed meter that will consistently produce seed singulation accuracies of 98% or above.

With respect to vacuum type seed meters, a number of factors can affect seed singulation accuracies. One such factor is the treatment applied to the seeds. The seed corn industry is applying new formulations and heavier treatments to the seed to protect the seed from new pests and other insects and disease, but which are also more environmentally friendly. These new treatments can make the seed surface rough, thereby affecting entrainment over the apertures of vacuum disks. Additionally, some of these new treatments can become sticky, requiring more aggressive agitation of the seeds within the seed pool of the meters in order to keep the seeds from sticking together.

One type of vacuum meter that has experienced commercial success in recent years is the John Deere Pro-Series™ Meter found on Deere's central-fill or bulk-fill planters such as disclosed in U.S. Pat. Nos. 6,581,533 and 6,935,255 both of which are incorporated herein by reference. While the Pro-Series™ Meter may serve its intended purpose certain factors can effect its performance.

For example, as previously identified, certain heavily coated seed treatments may cause the seed within the seed pool to stick together reducing the flowability of the seed. Thus, unless the seed is aggressively agitated by the seed disk as it rotates through the seed pool, the reduced flowability may result in poor loading of the seed onto the apertures of the seed disk, which translate into seek skips in the furrow. Deere's standard seed disks for the Pro-Series™ Meter do not provide very aggressive agitation. As a result, under some conditions when using Deere's standard disks, the performance or accuracy of the seed meter can be less than desirable.

In order to overcome this problem, farmers have attempted to replace Deere's standard seed disks with after-market disks that have larger or deeper ribs or fins to provide more aggressive agitation of the seeds. While these deeper ribs provide more aggressive agitation to keep the seed pool fluid, it has been found that some of these after-market disks can increase the likelihood for the seed meter to overfill which can lead to meter performance problems or failures.

It has been determined that the potential for overfilling of the Pro-Series™ Meter when using seed disks designed to provide greater seed pool agitation, is partially attributed to the size and position of the opening within the seed meter housing through which the seed enters the seed reservoir from the auxiliary hopper. As will be explained in more detail later, when using larger or deeper ribs, more seeds are scooped up by the larger ribs which, due to the size and position of the opening, the void created by the seeds scooped up by the larger ribs is replenished with new seeds entering from the auxiliary hopper. Thus, in such circumstances, more seeds continually enter the seed reservoir than are actually being discharged out of the seed meter. As the seed disk rotates, the extra seeds carried by the larger ribs are returned to the seed pool which further adds to the seed pool that has already been replenished. Accordingly, over time, the meter can overfill.

Deere made an attempt to eliminate the tendency of the Pro-Series™ Meter to overfill by positioning a brush as a sort of lid to hold back or prevent the seed from rising above the seed reservoir. This brush lid is shown in U.S. Pat. No. 6,581,533 (see FIG. 4 of '533 patent at reference numeral 68). While Deere's approach was moderately successful, where more aggressive agitation on the disk is needed, the brush lid does not sufficiently prevent over filling. Additionally, the presence of the brush can have an adverse effect upon meter performance as some seed types and sizes of seeds are physically disturbed by the brush while the seeds are being loaded on the seed disk, thereby causing unwanted skips.

Accordingly, there is a need for a cost effective solution that will enable farmers to modify or retrofit their existing Pro-Series Meters to overcome the deficiencies described above while not having to replace the entire seed meter. Similarly, there is a need for a new design which can be adopted by original equipment manufacturers or after-market suppliers to overcome the deficiencies associated with the existing Pro-Series design with minimal retooling or changes to the seed meter and with minimal changes to the on-demand delivery system structure.

DETAILED DESCRIPTION

Figure 1:
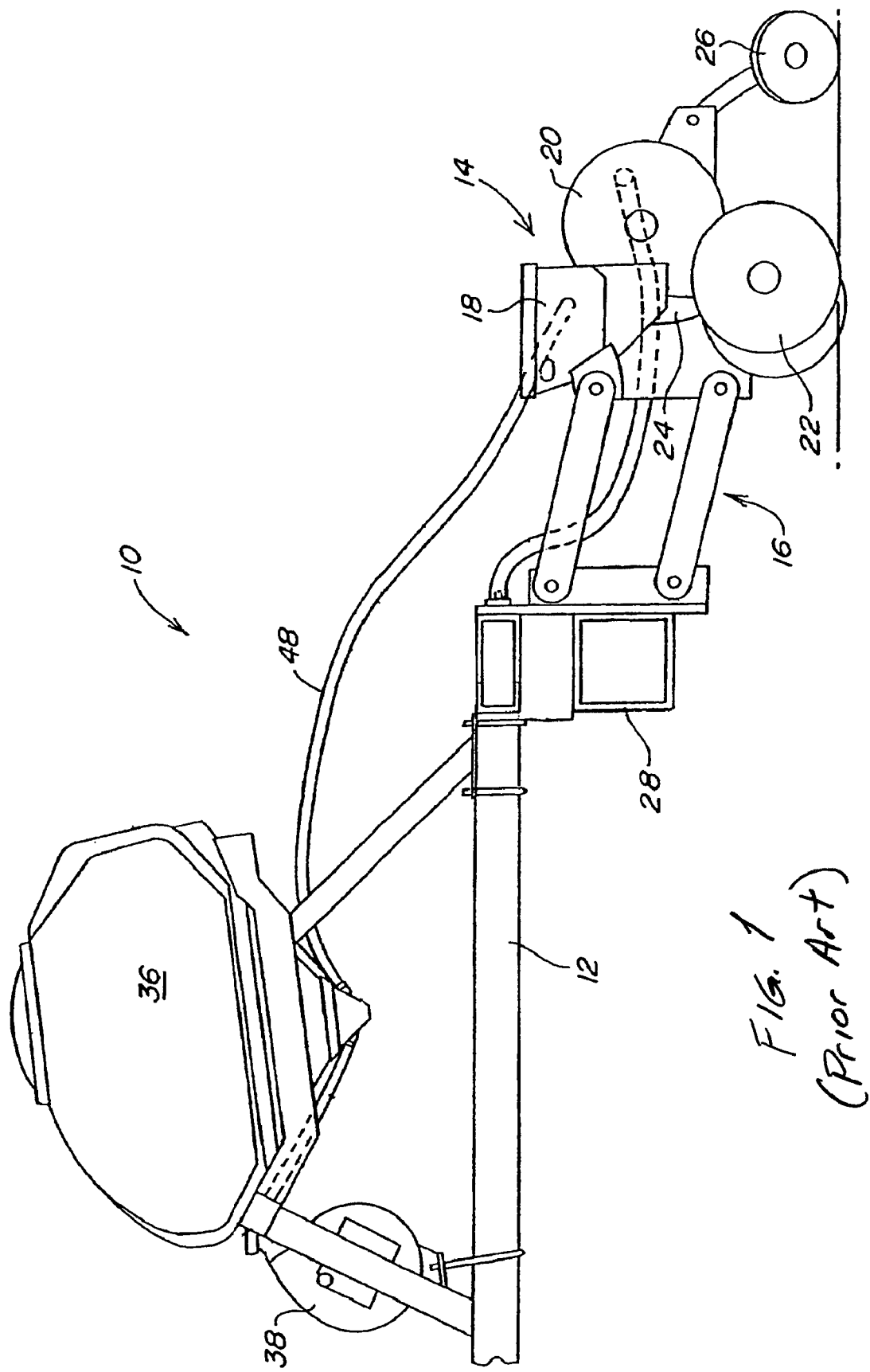
FIG. 1 is a partial side elevation view of a conventional central-fill agricultural planter illustrating a conventional product-on-demand delivery system such as manufactured by Deere & Company.

Referring now to the drawings, wherein like reference numerals designate identical or corresponding parts throughout the several views, FIG. 1 illustrates a conventional central-fill planter 10 such as manufactured by Deere & Company, and which utilizes a Pro-Series™ Meter's as disclosed in U.S. Pat. Nos. 6,581,533 and 6,935,255 previously incorporated herein by reference.

The central fill planter 10 includes a main frame 12 having a main tool bar 28 from which a plurality of spaced row units 14 are supported by a parallel linkage 16. The parallel linkage 16 enables the individual row units 14 to move vertically independently of one another to conform to terrain or upon encountering an obstacle during planting operations. Each of the individual row units 14 comprises a "mini-hopper" or "auxiliary hopper" 18, the purpose of which will be described later. Additionally, each row unit 14 includes a seed meter 20, a furrow opener 22 and a furrow closing assembly 26. The main frame 12 also supports a main or central hopper 36 and an air pump or blower 38. The main hopper holds a bulk supply of seed.

In operation, the blower 38 pneumatically transfers seed from the central hopper 36 via product supply hoses 48 to each of the individual auxiliary hoppers 18 as needed, hence this type of central fill system is referred to as a "product-on-demand" delivery system. The seed meter 20 meters seed received from the auxiliary hopper 18. The furrow opener 22 forms the planting furrow in the soil surface into which the individual seeds metered at regularly spaced intervals by the seed meter 20 are deposited after being directed downwardly and rearwardly by the seed tube 24. The closing assembly 26 pushes the soil back into the furrow covering the seed.

Figure 2:
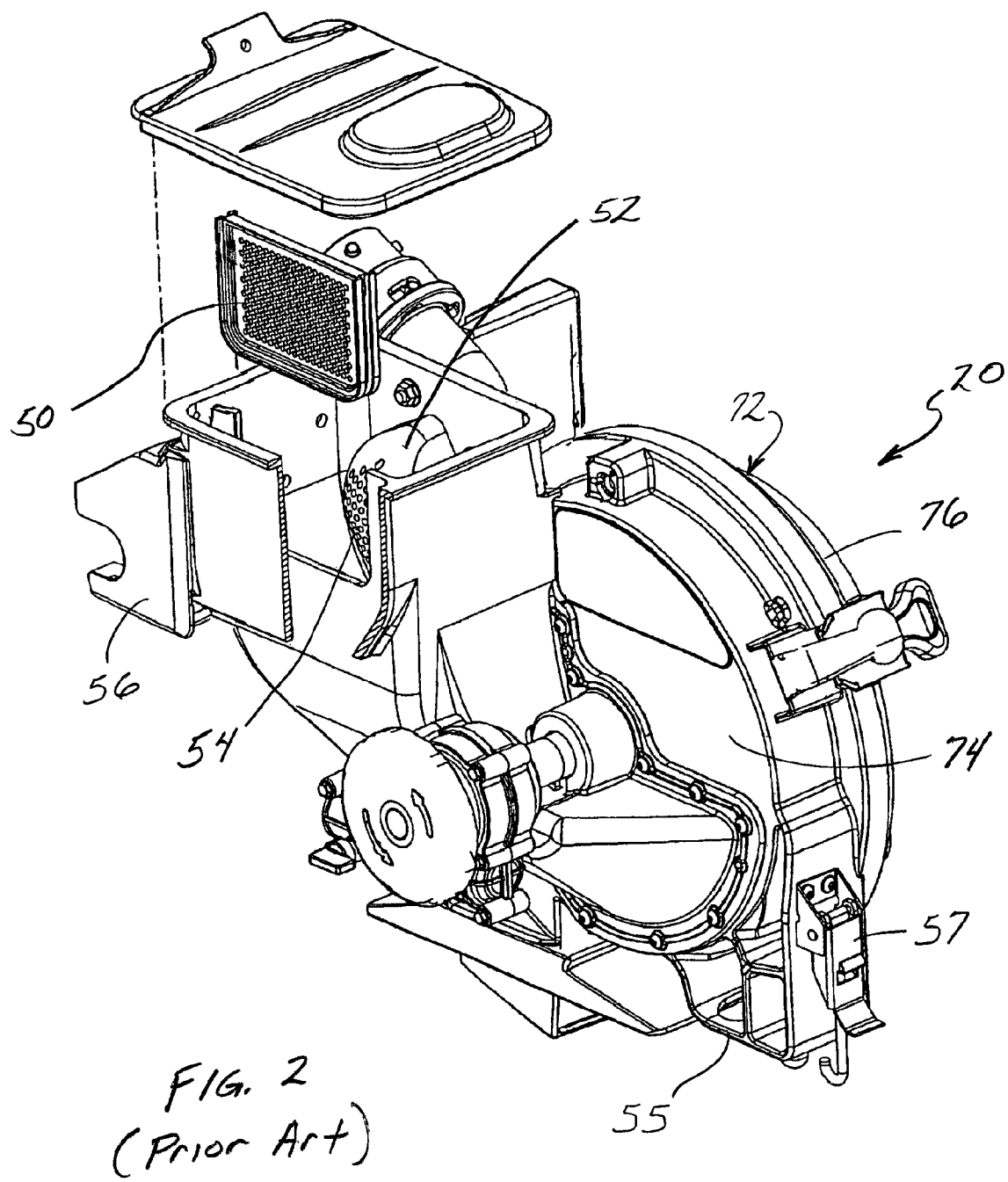
FIG. 2 is a more detailed perspective view of a portion of the central-fill planter of FIG. 1 illustrating a conventional Pro-Series™ seed meter and auxiliary hopper.

The on-demand delivery of seed to the auxiliary hoppers 18 is regulated or controlled through a venting system. As best illustrated in FIG. 2, each auxiliary hopper 18 includes a vent 50 disposed in a sidewall of the auxiliary hopper 18. Within the auxiliary hopper 18 is a downwardly curving, perforated air separation tube 52. As seed is communicated from the main hopper 36 to the auxiliary hopper 18 via the product supply hose 48, air escapes through the perforations 54 thereby separating the seeds from the air stream. The seeds drop into the bottom of the auxiliary hopper 18 from the bottom of the perforated air separation tube 52 and the air escapes through the vent 50 in the sidewall of the auxiliary hopper 18. As the auxiliary hopper 18 fills with seed, the perforations 54 in the perforated air separation tube 52 get covered with seed. As the perforations 54 are covered, the volume of air that can escape through the perforations is reduced, thus reducing the air flow through the tube 52, which, in turn, reduces the amount of seed being carried to the auxiliary hopper 18 by the product supply hose 48. As the seed within the auxiliary hopper 18 is consumed by passing into the seed meter 20, the seed level will drop, exposing more of the perforations 54 and allowing more air, and thus more seed, to flow once more into the auxiliary hopper 18, thereby maintaining a steady supply of seed within the auxiliary hopper 18.

Figure 3:
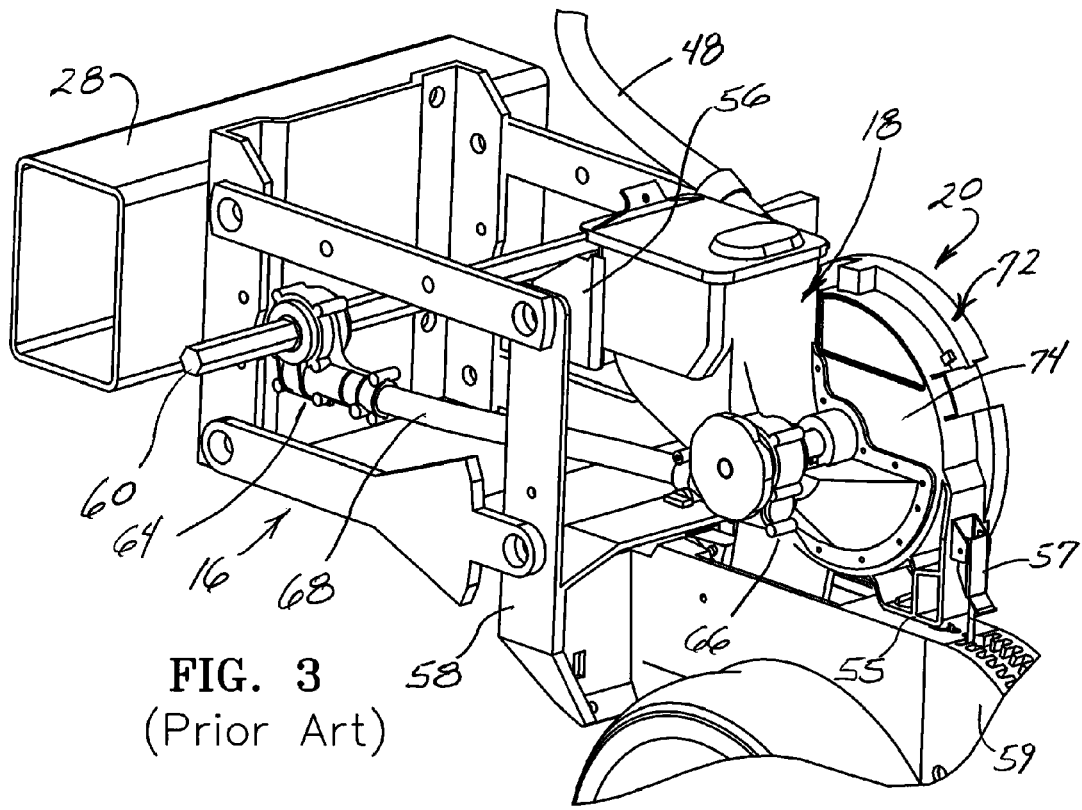
FIG. 3 is a more detailed perspective view of the conventional Pro-Series™ seed meter and auxiliary hopper of FIG. 2.

As best illustrated in FIG. 3, the auxiliary hopper 18 is mounted to the back housing member 74 of the seed meter 20. The meter/hopper assembly 18/20 is supported at a forward end by a bracket 56 disposed between the upright posts 58 of the row unit 14. A base bracket 55 helps support the meter/hopper assembly 18/20 above the furrow opener 22. A latch 57 secures the meter/hopper assembly 18/20 to the frame 59 of the furrow opener 22.

A hex-shaft 60 is supported parallel to the tool bar 28 and is operably driven by the rotation of the ground wheels (not shown) as the planter is pulled through the field. The rotation of the hex-shaft 60 operably drives the seed meter 20 by rotating the seed meter drive shaft 62 which is, in turn, operably connected to the hex-shaft 60 via forward and rearward gearboxes 64, 66 and a flexible shaft 68. The seed meter drive shaft 62 is substantially coaxial with the central axis of the seed meter 20.

The Pro-Series™ meter 20 comprises a housing 72 which includes a back housing member 74 and a front housing member 76. Disposed within the housing is a seed disk (not shown for clarity) such as disclosed in U.S. Pat. No. 5,170,909 to Lundie et al. (the "Lundie '909 Patent"), incorporated herein by reference. The seed disk rotates within the housing 72 coaxially with the drive shaft 62. As illustrated in the Lundie '909 Patent, the seed disk includes a plurality of radially spaced apertures near its outer periphery.

In operation, seed is communicated from the auxiliary hopper 18 into the seed reservoir of the seed meter 20 through an opening 80. A negative pressure source (not shown) draws air from the seed meter 20 from the side of the seed disk opposite the seed reservoir, thereby producing a pressure differential on opposing sides of the seed disk. This pressure differential causes the seeds within the seed reservoir to become entrained or "loaded" over the apertures as the disk rotates through the seed reservoir. As the disk rotates past a seal (not shown) disposed within the seed meter 20, the source of the vacuum is isolated thereby eliminating the pressure differential causing the seeds to fall from the face of the disk. The falling seed is received within a seed tube 24 where it is directed downwardly and rearwardly into the seed furrow created by the furrow opener 22.

Figure 4:
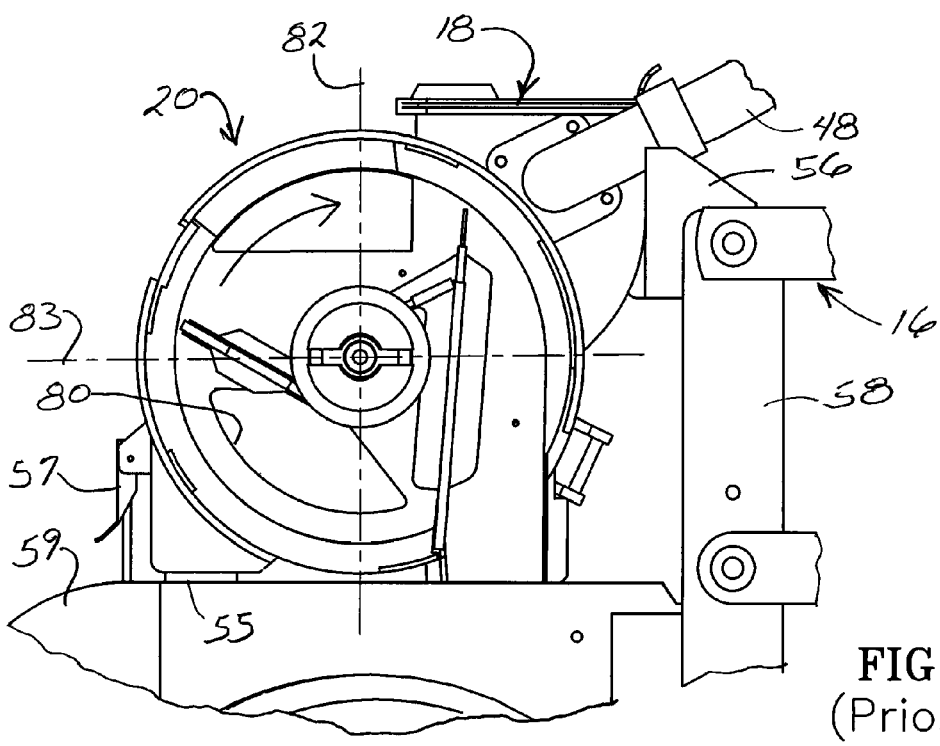
FIG. 4 is a side elevation view of the interior of the conventional Pro-Series™ seed meter and auxiliary hopper of FIG. 2.

Referring to FIG. 4, it can be seen that the opening 80 through which the seed is communicated from the auxiliary hopper 18 into the seed reservoir begins at approximately the 5 o'clock position, or approximately ¾ inch forwardly of the vertical axis 82 of the seed meter 20. The opening extends arcuately rearwardly as viewed in FIG. 4 to approximately the 8:30 position. As previously described, it has been determined that with the opening 80 extending forwardly of the vertical axis 82 of the seed meter, excess seeds enter the seed reservoir when the seed disk rotates through the seed reservoir, particularly if a seed disk with more aggressive agitation ribs are utilized, which, over time, can result in overfilling of the meter 20.

In order to minimize the chance of overfilling occurring even when utilizing seed disks with very aggressive agitation, while still utilizing much of the seed meter structure and the on-demand-delivery structure of the Pro-Series™ meter, one embodiment of the present invention is directed to a cost effective solution in the form of a retrofit kit. Additionally, rather than a retrofit kit, an original equipment manufacturer and/or an aftermarket supplier could incorporate the structural and functions features as disclosed herein to overcome the deficiencies associated with the existing Pro-Series™ meter design with minimal retooling or changes to the seed meter and with minimal changes to the existing on-demand delivery system structure.

Figure 5:
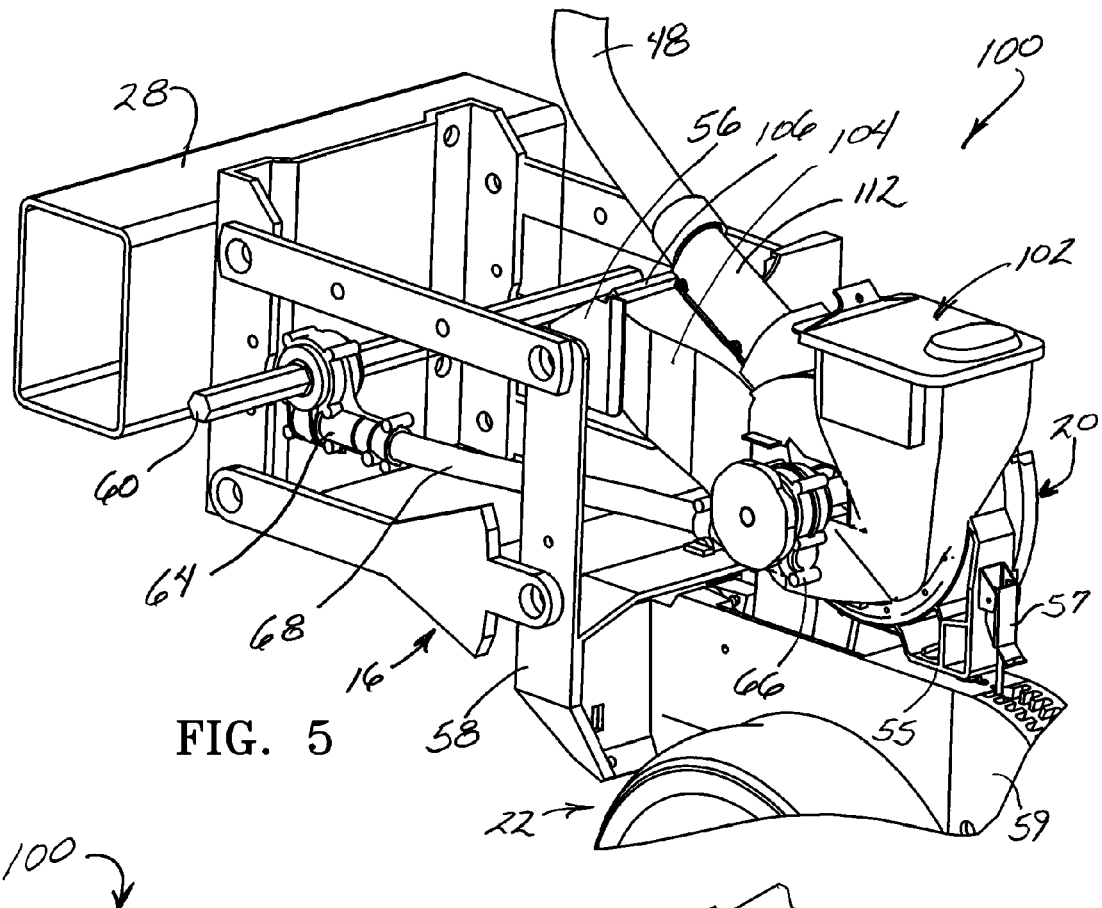
FIG. 5 is a perspective view from the same perspective as FIG. 2 illustrating one embodiment of an auxiliary hopper assembly of the retrofit kit of the present invention and/or of the improved on-demand seed delivery system of the present invention wherein the vent is incorporated into the auxiliary hopper.
Figure 6:
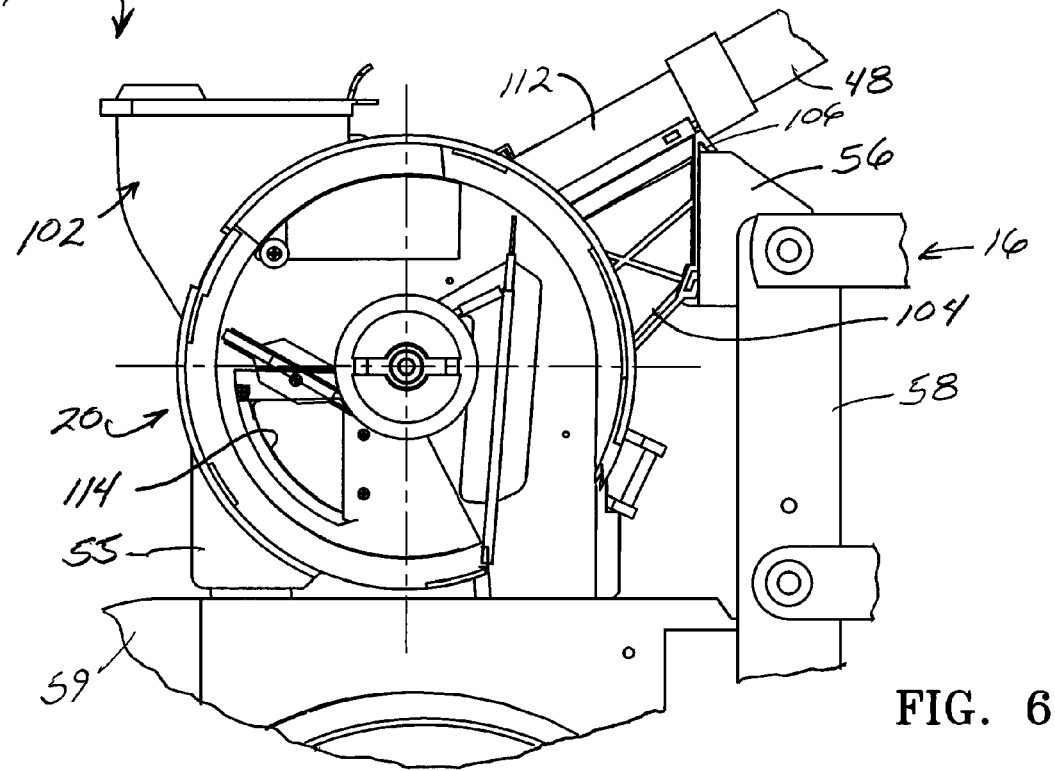
FIG. 6 is a side elevation view of the retrofit kit and/or improved on-demand seed delivery system of FIG. 5 showing the reduced opening beginning rearward of the vertical axis of the seed meter in relation to the original opening of the Pro-Series™ Meter shown in phantom lines.
Figure 7:
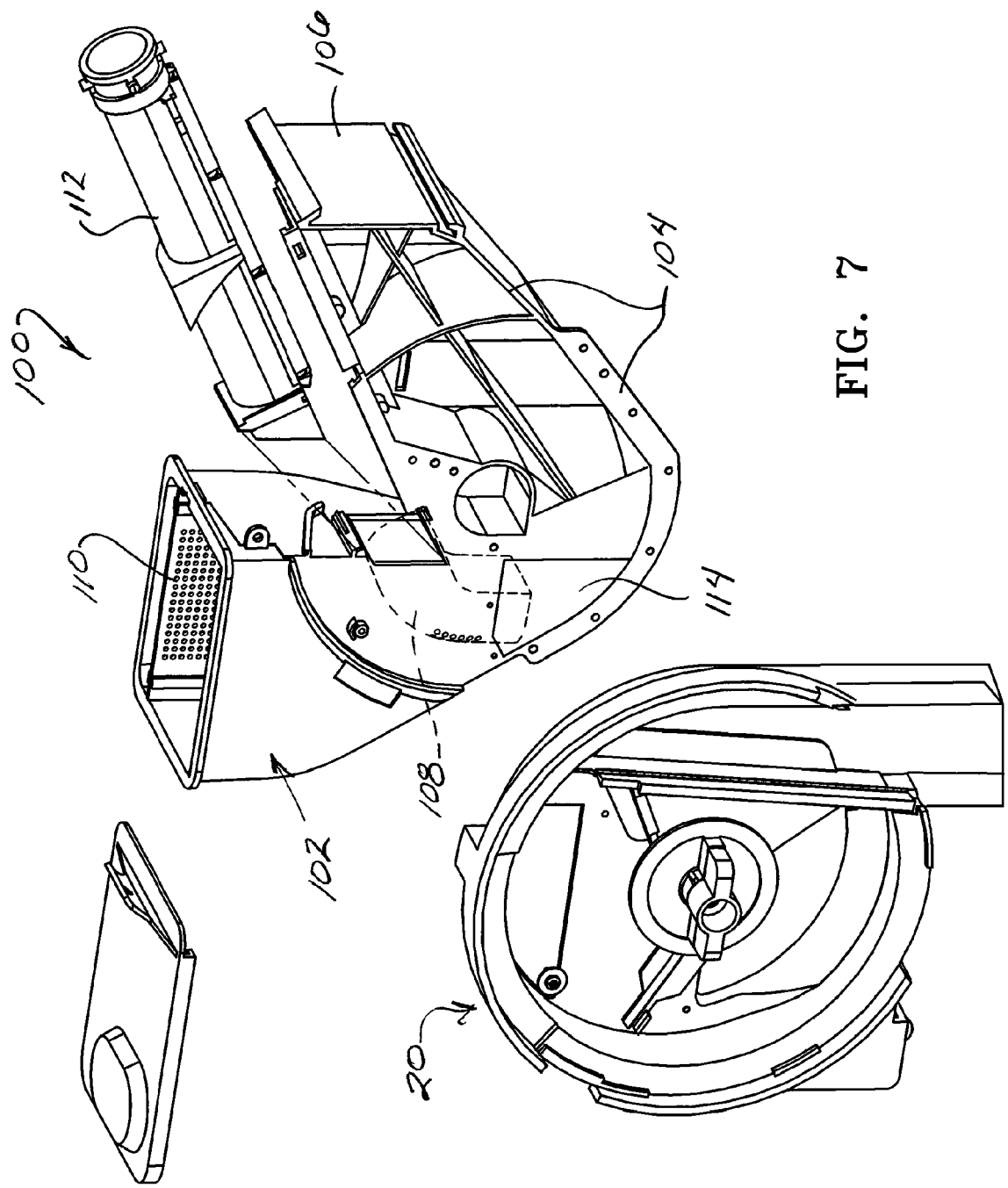
FIG. 7 is an exploded perspective view of the retrofit kit of FIG. 6.

FIG. 5 is a perspective view of one embodiment of a preferred retrofit kit 100 for a Pro-Series™ meter. FIG. 6 is a side elevation view of the retrofit kit embodiment of FIG. 5. FIG. 7 is an exploded perspective view of the retrofit kit embodiment of FIG. 5. The preferred retrofit kit 100 includes a replacement auxiliary hopper 102 which replaces the existing auxiliary hopper 18. The replacement auxiliary hopper 102 includes appropriate mounting structure 104 that cooperates with the existing structure of the planter and which preferably utilizes or takes advantage of the same connection points on the back housing member 74 of the seed meter 20 as the auxiliary hopper 18 being replaced. As illustrated in FIG. 7, the mounting structure 104 includes a forward bracket 106 that cooperates with the bracket 56 on the planter 10 to support the forward end of the replacement auxiliary hopper 102. In this embodiment, a perforated air separation tube 108 and vent 110 preferably substantially similar to the perforated air separation tube 52 and vent 50 of the original auxiliary hopper 18 are utilized. In comparing position of the replacement auxiliary hopper illustrated in FIGS. 5-7 to the position of the original auxiliary hopper being replaced as illustrated FIGS. 3 and 4, it should be apparent that the replacement auxiliary hopper 102 of the retrofit kit 100 is positioned rearward of the seed meter drive shaft 62 as opposed to forward of the drive shaft 62 as in FIGS. 3 and 4. Accordingly, an extension pipe 112 is provided to connect the perforated air separation tube 108 to the product supply hose 48.

The replacement auxiliary hopper 102 preferably includes an opening 114 which, as best illustrated in FIG. 6, preferably begins rearward of the vertical axis 82 of the seed meter 20 (preferably at about the 7 o'clock position) and extends arcuately rearwardly in toward the horizontal axis 83 (preferably to approximately the 8:30 position). As a result, the opening 114 through which seed enters the seed meter 20 is reduced, permitting the seed meter 20 to operate more like the type of meter disclosed in the Lundie '909 Patent.

Figure 8:
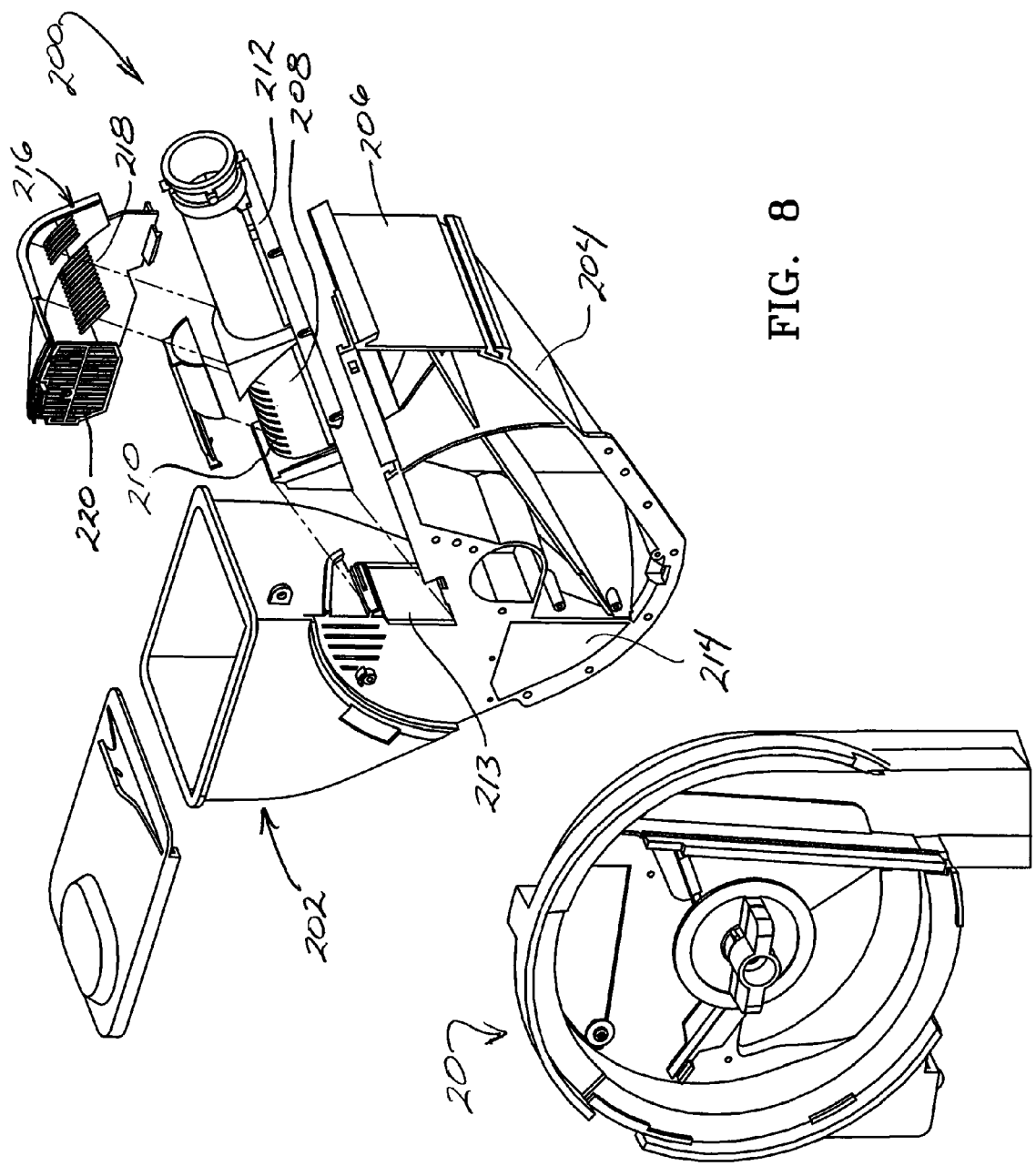
FIG. 8 is an exploded perspective view of an alternative embodiment of the auxiliary hopper assembly of the retrofit kit of the present invention and/or of the improved on-demand seed delivery system of the present invention wherein the vent is incorporated into the inlet pipe of the auxiliary hopper.

FIG. 8 illustrates an alternative embodiment of a retrofit kit 200 of the present invention. In this embodiment the replacement auxiliary hopper 202 is substantially similar to the previously described embodiment, in that the replacement auxiliary hopper 202 includes appropriate mounting structure 204 that cooperates with the existing structure of the planter 10 and which preferably utilizes or takes advantage of the same connection points on the back housing member 74 of the seed meter 20 as the auxiliary hopper 18 intended to be replaced. As illustrated in FIG. 8, the mounting structure 204 includes a forward bracket 206 that cooperates with the bracket 56 on the planter 10 to support the forward end of the replacement auxiliary hopper 202.

Unlike in the previous embodiment, however, an air separation tube 208 is incorporated into the extension pipe 212, thereby eliminating the need for the vent and perforated air separation tube within the auxiliary hopper. The air separation tube 208 includes slots 210 through which air escapes. A vent regulator 211 may be provided for positioning over the slots 210 to increase or decrease the amount of air flow through the slots 210. In this embodiment, the auxiliary hopper 202 will maintain a level of seed at a height approximate the top of the aperture 213 in the sidewall of the hopper into which the extension pipe 212 is received. A vent cover 216 preferably mounts over the slots 210 in the air separation tube 208. The vent cover 216 preferably includes a first set of slots 218 through which air can escape to atmosphere and a second set of slots 220 in communication with the interior of the seed meter 20 to ensure adequate air flow through the seed meter for proper performance.

As with the previous embodiment, the replacement auxiliary hopper 202 preferably includes an opening 214 which preferably begins rearward of the vertical axis 82 of the seed meter 20 (preferably at about the 7 o'clock position) and extends arcuately rearwardly toward the horizontal axis 83 (preferably to approximately the 8:30 position). As a result, the opening 214 through which seed enters the seed meter 20 is reduced, permitting the seed meter 20 to operate more like the type of meter disclosed in the Lundie '909 Patent.

Figure 9:
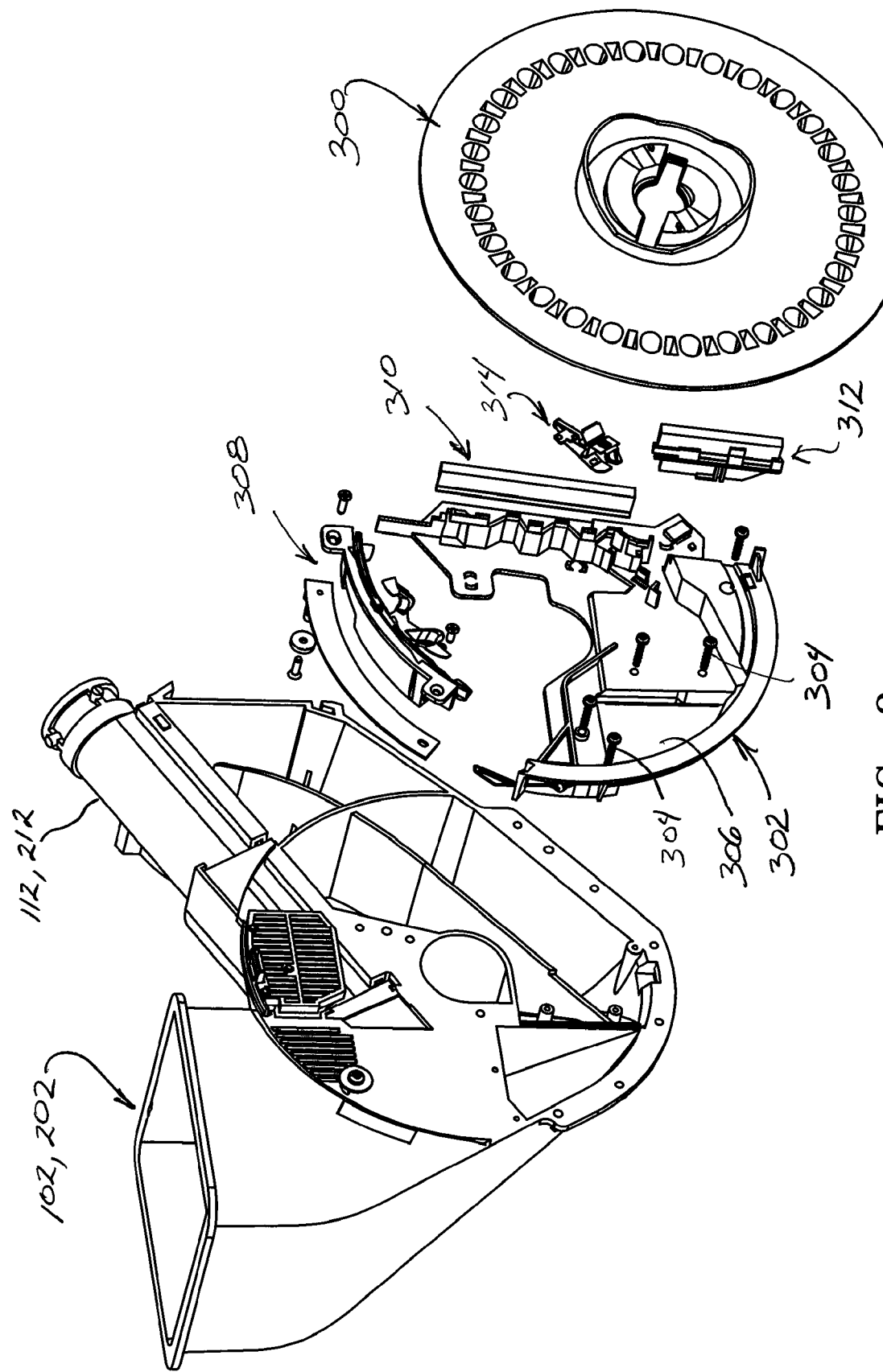
FIG. 9 is an exploded perspective view of yet another embodiment of the retrofit kit of the present invention and/or of the improved on-demand seed delivery system of the present invention wherein the eSet® offset seed disk system is being utilized.

FIG. 9 illustrates additional components that may be used for retrofitting an existing Pro-Series™ meter by taking advantage of the offset disk system as disclosed in Applicant's co-pending application Ser. No. 11/465,164 (Pub. No. US2007/0039529), which is incorporated herein by reference, the commercial embodiment of which is sold under the trademark eSet®. Although FIG. 9 illustrates the replacement auxiliary hopper embodiment 202 as just described with respect to FIG. 8, it should be appreciated that the replacement auxiliary hopper embodiment 102 as illustrated in FIGS. 5-7 may also be utilized with the eSet® system. The back housing member 74 to which the auxiliary hopper 202/102 mounts is not shown in FIG. 9. The eSet® system includes the offset disk 300, a liner 302 which is received within the interior of the back housing member 74 and secured thereto by suitable fasteners 304. The liner 302 includes an opening 306 which mates with the opening 214/114 of the auxiliary hopper 202/102. The eSet® system further includes the singulator 308, brush assemblies 310, 312 and fragment extractor 314 all as disclosed in the above-referenced '164 application.

The foregoing description is presented to enable one of ordinary skill in the art to make and use the invention and is provided in the context of a patent application and its requirements. Various modifications to the preferred embodiment of the apparatus and the general principles and features described herein will be readily apparent to those of skill in the art. Thus, the present invention is not to be limited to the embodiments of the apparatus and methods described above and illustrated in the drawing figures, but is to be accorded the widest scope consistent with the spirit and scope of the appended claims.

The invention claimed is:

1. A method of retrofitting a pneumatic on-demand seed delivery system in which seeds are pneumatically communicated via a product supply hose into an auxiliary hopper and from the auxiliary hopper into a seed reservoir of a seed meter housing through a seed inlet opening in the seed meter housing, the seed inlet opening beginning forward of a vertical axis of the seed meter and extending arcuately rearwardly toward a horizontal axis of the seed meter, the method comprising:
   disconnecting the product supply hose from the auxiliary hopper;
   removing the auxiliary hopper secured to an exterior back side of a housing of the seed meter thereby exposing the seed inlet opening;
   mounting a replacement auxiliary hopper to said exterior back side of said seed meter housing, said replacement auxiliary hopper having an opening beginning rearward of the vertical axis of the seed meter and extending arcuately rearwardly toward the horizontal axis;
   operatively attaching the product supply hose to the replacement auxiliary hopper for pneumatically communicating seeds thereto.

2. The method of claim 1 wherein said auxiliary hopper includes a vent by which seed entering said replacement auxiliary hopper is regulated.

3. The method of claim 1 further including providing an inlet pipe to operatively connect the product supply hose to the replacement auxiliary hopper, said inlet pipe having a vent by which seed entering said replacement auxiliary hopper is regulated.

4. The method of claim 1 further comprising:
   removing an existing seed disk from the seed meter housing;
   removing all existing brushes from the seed meter housing;

replacing the removed seed disk with an offset seed disk;

securing a liner to an interior back side of the seed meter housing, said liner having an opening mating with said opening in said replacement auxiliary hopper, said liner having tabs for receivably securing replacement brushes that cooperate with said offset seed disk;

securing said replacement brushes to said liner.

5. A retrofit kit for a pneumatic on-demand seed delivery system in which seeds are pneumatically communicated via a product supply hose into an auxiliary hopper and from the auxiliary hopper into a seed reservoir of a seed meter housing through a seed inlet opening in the seed meter housing, the seed inlet opening beginning forward of a central vertical axis of the seed meter and extending arcuately rearwardly toward a central horizontal axis of the seed meter, the retrofit kit comprising:

a replacement auxiliary hopper sized to mount onto a back side of the seed meter housing and to cooperate therewith, said replacement auxiliary hopper having an opening beginning rearward of the central vertical axis of the seed meter and extending arcuately rearwardly toward the central horizontal axis of the seed meter.

6. The retrofit kit of claim 5 wherein said replacement auxiliary hopper includes a vent by which seed entering said replacement auxiliary hopper is regulated.

7. The retrofit kit of claim 5 further comprising an inlet pipe to operatively connect the product supply hose to the replacement auxiliary hopper, said inlet pipe having a vent by which seed entering said replacement auxiliary hopper is regulated.

8. The retrofit kit of claim 5 further comprising:

an offset disk;

a liner sized to be received within an interior back side of the seed meter housing, said liner having an opening mating with said opening in said replacement auxiliary hopper;

replacement brushes mountable to said liner, said replacement brushes cooperating with said offset seed disk.

\* \* \* \* \*